(12) United States Patent
König

(10) Patent No.: US 11,598,752 B2
(45) Date of Patent: Mar. 7, 2023

(54) PHOTOACOUSTIC MEASUREMENT SETUP AND METHOD FOR DETECTING A GAS

(71) Applicant: TDK Corporation, Tokyo (JP)

(72) Inventor: Matthias König, Munich (DE)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/246,278

(22) Filed: Apr. 30, 2021

(65) Prior Publication Data

US 2021/0349056 A1 Nov. 11, 2021

(30) Foreign Application Priority Data

May 5, 2020 (DE) .......................... 102020112123.7

(51) Int. Cl.
*G01N 29/24* (2006.01)
*G01N 29/44* (2006.01)

(52) U.S. Cl.
CPC ..... *G01N 29/2418* (2013.01); *G01N 29/4481* (2013.01)

(58) Field of Classification Search
CPC ........... G01N 29/2418; G01N 29/4481; G01N 29/2425; G01N 29/46; G01N 2021/1704; G01N 21/1702
See application file for complete search history.

(56) References Cited

U.S. PATENT DOCUMENTS

| | | |
|---|---|---|
| 2018/0188213 A1 | 7/2018 | Tumpold |
| 2019/0360975 A1 | 11/2019 | Eberl |
| 2020/0025677 A1* | 1/2020 | Prater ........................ G01J 3/44 |
| 2022/0136957 A1* | 5/2022 | Biesinger ........... G01N 21/1702 73/24.02 |

FOREIGN PATENT DOCUMENTS

| | | |
|---|---|---|
| DE | 102012217479 B3 | 10/2013 |
| DE | 102017129471 A1 | 7/2018 |
| DE | 102018112341 A1 | 11/2019 |
| EP | 0859536 A1 | 8/1998 |

* cited by examiner

*Primary Examiner* — Suman K Nath
(74) *Attorney, Agent, or Firm* — Nixon Peabody LLP

(57) ABSTRACT

A photoacoustic measurement setup having an infrared radiator that is suitable for radiating broadband light with periodically modulated energy/intensity. The infrared radiator is configured to change an excitation spectra of a radiated broadband light, and a gas volume is heated by the radiated broadband light to generate an acoustic wave within the gas volume. The photoacoustic measurement setup also includes an acoustic sensor, which is suitable for measuring the acoustic wave generated in the gas volume.

19 Claims, 5 Drawing Sheets

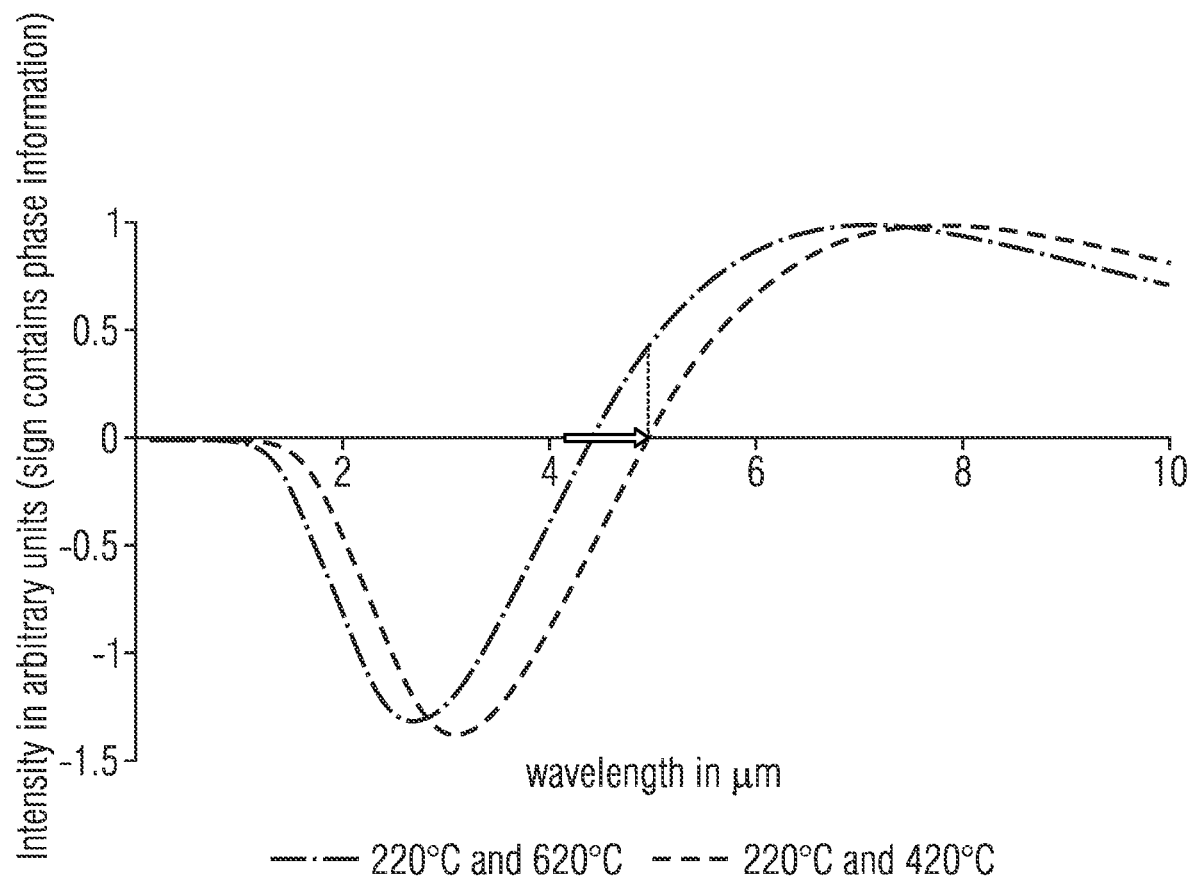

PHOTOACOUSTIC MEASUREMENT SETUP AND METHOD FOR DETECTING A GAS

CROSS-REFERENCE TO RELATED APPLICATIONS

This application claims the benefit of German Patent Application No. 102020112123.7, filed May 5, 2020, which is incorporated herein by reference in its entirety.

TECHNICAL FIELD

The present invention concerns a photoacoustic measurement setup. In addition the present invention relates to a method for detecting a gas mixture and a method for identifying a gas employing the photoacoustic measurement setup.

BACKGROUND

The photoacoustic effect describes a generation of sound waves by absorption of a light in a gaseous, liquid or solid sample. After light of a certain wavelength is absorbed in such a sample, the molecules are excited to a higher level of rotation, vibrational or electronic states. The energy stored in the excited states is either emitted as spontaneous or stimulated emission in the form of radiation or transferred radiationless as kinetic energy by collision with the surrounding atoms or molecules. As the lifetime of the rotational and vibrational states is typically much longer than the time to relax by collisional processes, almost all the energy deposited into the sample is converted into kinetic energy. This leads to a local increase in temperature and hence to an increase in pressure in the excited volume.

SUMMARY

If the energy/intensity of the incident light beam is modulated periodically, this modulation is transferred to the pressure level. Periodic pressure fluctuations/sound waves are created, whose frequency is determined by the energy/intensity modulations of the light beam and whose amplitude/sound pressure is determined by the amount of absorbed light. Since every molecule has its own specific absorption spectra, it is possible to identify a sample with the photoacoustic effect by changing the wavelength of the light source.

A drawback of a measurement done with the photoacoustic effect is the necessity to use a monochromatic infrared (IR) light source, which should be tunable, to discriminately excite the sample or a composition of the sample in a specific absorption line in order to identify the sample. Light sources which satisfy these requirements are either expensive, as quantum cascade laser (QCL), or limited to a hand full of wavelengths, if filters are used. Moreover, mechanically changing a filter in such a measurement setup, as often done by a filter wheel, cannot be miniaturized easily.

For photoacoustic measurement setups it is desirable to find a way to omit the necessity of monochromatic light sources and to still be able to identify a sample, as well as being suitable for miniaturization.

The object of the present invention is to provide a photoacoustic measurement setup that is cheap, miniaturizable and allows for reliable measurements.

The object is solved by a photoacoustic measurement setup according to claim 1. Further advantageous designs, potential arrangements and favourable methods for measuring can be found in the dependent claims.

A photoacoustic measurement setup is provided which comprises an infrared radiator, which is suitable for radiating broadband light with periodically modulated intensity. The infrared radiator is configured to change an excitation spectra of a radiated broadband light, and a gas volume is heated by the radiated broadband light to generate an acoustic wave within the gas volume. The photoacoustic measurement setup also comprises an acoustic sensor, which is suitable for measuring the acoustic wave generated in the gas volume.

Such a photoacoustic measurement setup does not require a monochromatic radiator, which main wavelength and wavelength distribution also should be tunable as some IR-lasers or a QKL, in order to measure an acoustic wave generated by the photoacoustic effect. As such monochromatic radiators are still quite expensive, the photoacoustic measurement setup proposed is much more economic than comparable measurement setups. Moreover, all the components of the proposed measurement setup, as the infrared radiator and the acoustic sensor, are suitable for miniaturization, or there are already miniaturized components that can be used, as e.g. MEMS-microphones and -heaters. The acoustic sensor can be sensitive enough to detect small pressure fluctuations. Above all, the acoustic sensor can be able to detect and differentiate between overpressure and underpressure. The infrared light radiated by the infrared radiator can be electromagnetic radiation with a wavelength in a range from 780 nm to 1 mm, preferably in a range from 1 μm to 100 μm.

Preferably, the infrared radiator can comprise at least two heaters. Every thermal radiator, as a coil, a wire, a filament, but also semiconductors can be used as a heater. By arranging two or more heaters in the infrared radiator it is possible to manipulate the emitted broadband light with a higher degree of freedom. For example, it is possible to arrange a plurality of heaters in an array in order to adjust the intensity of the radiated light by switching selected heaters on or off.

In one embodiment, the heaters are arranged outside of the photoacoustic measurement cell. For example, the heaters of the infrared radiator may emit broadband light through a window into the photoacoustic cell. Two or more heaters may be arranged outside of the photoacoustic measurement cell.

Also the excitation spectra emitted by the infrared radiator can be changed by changing a temperature of the infrared radiator. A preferred temperature range for the infrared radiator is 100° C.-1300° C., but depending on the radiator also temperatures up to 3000° C. are possible. In the ideal case the radiator emits a black-body radiation just dependent on the temperature according to Planck's law. By changing the temperature of the infrared radiator or heater, not only the peak intensity of the emitted radiation, but also the intensity distribution of the emitted light can be changed. A higher temperature leads to a peak intensity at shorter wavelengths and more proportions of the intensity distribution at shorter wavelengths, whereby the emitted light at lower temperatures of the heater has a peak at longer wavelengths with more proportions of the emitted light at longer wavelengths. As the temperature of a heater usually can be controlled conveniently, also the excitation spectra emitted can be easily adjusted to a desired spectra. By changing the temperature of the infrared radiator, it is possible to measure several measurement points in one setup by adjusting the temperature. Every measurement point corresponds to a temperature of the infrared radiator.

It is advantageous, if the heaters are each individually controllable. In this way every heater can be switched on and off independently, but also the emitted excitation spectra of each heater can be adjusted at will by the temperature of the heater. If an array of heaters is used, a good thermal isolation between adjacent heaters is beneficial to maintain the independence of the heaters as a thermal heat transfer would introduce a correlation. Moreover, also the temporary modulation of each heater can be adapted individually to change the temporal pattern a gaseous volume is subjected to.

Hence, the excitation spectra emitted by the infrared radiator can be changed by a periodic intensity modulation of at least one heater being phase-shifted with respect to the periodic intensity modulation of at least one other heater. As the gaseous volume is subjected to the phase-shifted and non-phase-shifted light, the acoustic wave generated in the gaseous volume is dependent on the phase-dependent sum of the broadband excitation light of the at least two heaters. In the easiest case, where the light intensity and the spectrum of two heaters are the same, but a phase modulation of one heater has a phase difference of 180° compared to the other, both acoustic waves annihilate each other by a destructive interference and no acoustic wave is detectable. In general, the magnitude of a detectable acoustic wave is dependent on the phase-dependent sum of both excitation spectra and the absorption spectrum of the gas. By shifting the phase, the phase-dependent sum is changed and hence the gaseous volume is subjected to another excitation spectrum.

Furthermore, the infrared radiator may be suitable to emit the same light intensity for different broadband excitation spectra by adjusting a surface from which heat is emitted. As the heater behaves similar to an idealized black body, the emitted radiation obeys the Stefan-Boltzmann law according to which the total radiated power has a $\sim T^4$ dependency, wherein T is the temperature in Kelvin, and a linear $\sim A$ dependency, wherein A is the emitting surface. Hence, for example, in order reach the same radiated power at 500° K compared to 1000° K, the heater has to have an emitting surface that is 16 times larger. Therefore, an infrared radiator, that can adapt the emitting surface to different temperatures and hence different broadband excitation spectra, is beneficial as it can provide the same total radiated power to the gaseous volume.

Also the heaters can be silicon-based. A silicon-based microheater may have an edge length of less than 500 μm. Hence, in a heater array with just 5*5 mm² at least 100 microheaters can be arranged. Consequently, silicon-based heaters are an appropriate approach to miniaturize the photoacoustic measurement setup.

Additionally, the photoacoustic measurement setup may comprise a lock-in amplifier, which is suitable to amplify a measurement signal. The measurement signal is the electrical signal the acoustic sensor outputs. Lock-in amplifiers can amplify a weak signal if the frequency and the phase of the signal is known. Thereby the signal to noise ratio is enhanced significantly and small signals can be measured. As the frequency and the phase of the heating broadband light of the infrared radiator is known, a lock-in amplifier can be used in the proposed photoacoustic measurement setup. The lock-in amplifier could, for example, be implemented in an FPGA to keep the dimensions small.

Moreover, the measurement setup could also comprise a wave guide which is configured to guide the light from the infrared radiator to the gaseous volume. As the gaseous volume does not have to be arranged right into the straight infrared beam, but can be arranged anywhere the other end of the wave guide reaches, much more design freedom for the photoacoustic measurement setup is achieved. Besides, wave guides provide an excellent beam profile making sure that a consistent gaseous volume is heated.

The gas volume and the acoustic sensor may be arranged in a photoacoustic cell. As the pressure increase in the gas volume in such an arrangement occurs in a confined space, where it cannot dissipate, the signal of acoustic sensor can be increased significantly.

Alternatively, the gas volume may be located between the infrared radiator and a photoacoustic cell, wherein a reference gas and the acoustic sensor are arranged in the photoacoustic cell. In this arrangement, the reference gas is a type of gas, which is known and which generates the acoustic wave in the photoacoustic cell.

In the gas volume, some wavelengths of the broadband excitation light are absorbed. Which wavelengths of the broadband excitation light are absorbed to which degree depends on the composition of the gas in the gas volume. Every gas has a different absorption characteristic depending on the molecular structure and the elements it consists of. In the range from 2.5 μm-4 μm mostly hydrogen bonds are excited. In the range from 4-6 mostly absorption lines from triple and double bonds are located. The wavelength range above 6 μm is called the fingerprint area. In this wavelength range are absorption lines of single bonds.

If the gas volume in between the infrared radiator and the photoacoustic cell contains the same type of gas as the reference gas, the wavelengths of the broadband excitation light are absorbed in the gas volume which are crucial for generating the acoustic signal in the reference gas. As a consequence, less infrared radiation of these wavelengths reaches the reference gas in the photoacoustic cell and the measurement signal from the acoustic sensor drops. The decrease of the measurement signal is dependent on the degree to which the gas in the gas volume is identical to the reference gas and on the concentration of the gas in the gas volume. In this way, the reference gas can be detected in the gas volume without having to introduce the gas volume into the photoacoustic cell. The reference gas can be any pure gas or any gas composition.

Further, the photoacoustic measurement setup can comprise a memory, wherein at least one reference spectrum is stored, as well as a control- and evaluation-unit which is designed to compare the reference spectrum with the measured values and to assign a content of the gas volume to a gas or a gas mixture and/or to determine a concentration of a gas mixture and to control the infrared radiator.

The reference spectrum can be a function or curve, wherein the signal of the acoustic sensor is plotted against a temperature of the infrared radiator. In a straightforward way, a reference spectrum for a certain gas can be obtained by measuring the signal of the acoustic sensor of this gas in the photoacoustic measurement setup in the desired temperature range and store this information in the memory. However, the reference spectra could also be obtained by folding measured or calculated absorption spectra of gases with measured or calculated emission spectra of the infrared radiator at different temperatures and integrating the folded spectra for every temperature over the whole wavelength range. In this way the total absorbed energy, which is linear to the energy of the acoustic wave, is calculated. If a pure gas is measured, a measured spectrum, wherein the spectrum is the acoustic sensor signal over the temperature, can match a reference spectrum and can be identified as the pure gas. In the case that a composition of different gases is measured, the measured spectrum can be a linear combination of the reference spectra of the different gases the composition consists of. The control- and evaluation-unit can approximate a linear combination of known reference spectra to the measured spectrum with e.g. the least square method. In this way the coefficient of the linear combination can be obtained, whereby a concentration of the gases in the composition can be evaluated.

Moreover, the control and evaluation unit can have a neural network. The neural network could be fed with numerous measured spectra for known gases and known gas composition in order to teach it to identify a gas. As in applications often just certain gases may be of interest, possible outcomes can be limited, which is beneficial for a neural network. Also, as a neural network is advantageous at pattern recognition, and a measured acoustic signal over different temperatures represent a pattern, a neural network for identifying a gas mixture is favourable.

One advantage of the described photoacoustic measurement setup is that it can be used for different measurement methods.

A method for detecting a gas mixture, comprises the following steps:

a. Detecting a first measurement signal of a composite gaseous sample, wherein the gaseous sample contains a first type of gas, that is known, and at least one further type of gas, with a photoacoustic measurement setup as described above, wherein the infrared radiator emits light with a first broadband excitation spectrum at a first temperature, b. Detecting a second measurement signal of the composite gaseous sample with the photoacoustic measurement setup, wherein the infrared radiator emits light with a second broadband excitation spectrum at a second temperature, c. Calculating an expected second measurement signal from the first measurement signal and the reference spectrum assuming that the gaseous sample is exclusively the first type of gas, d. Compare the expected second measurement signal with the measured second measurement signal, e. Determining if at least a further type of gas is in the gaseous sample.

The second temperature is different from the first temperature.

The proposed method allows to determine in a simple way with just two measurement points, if a gaseous sample is pure or a composition of different gases. In the case that it is known that the gaseous sample contains two known types of gases, the method is also suitable to determine the concentration of both gases in the gaseous sample. For this a system of two equation, each a linear combination of the known acoustic sensor signals for the first and second type of gas at the first and second measurement temperature has to be solved. The coefficients of this linear combinations are the concentrations of two types of gas in the gaseous sample.

Without restricting the method, the proposed method can be extended with a third, or n-th, measurement point, n being any real number larger than 3.

Hence, in step b. a third measurement signal of the composite gaseous sample can be detected with the photoacoustic measurement setup, wherein the infrared radiator emits light with a third excitation spectrum at a third temperature, and wherein in step c. a third expected measurement signal can be calculated from the first and second measurement signal and the reference spectrum assuming that the gaseous sample is exclusively a first and second type of gas, and wherein in step d. the third expected measurement signal can be compared with the measured third measurement signal, and wherein in step e. it is determined if at least a further type of gas is included in the gaseous sample.

Analogous to the preceding method this allows to determine in a simple way, with just three measurement points, if a gaseous sample is pure, contains two types of gases or at least one further type of gas. But this method is not restricted to just two or three types if gases in the sample, but can be extended to numerous types of gases. Hence this method is suitable for determine the number of gases in a composition. In the case that it is known how many types of gases the gaseous sample contains and the types of gases are also known, the method is also suitable to determine the concentration of the gases in the gaseous sample. For this a system of equations has to be solved, wherein each equation is a linear combination of the known acoustic sensor signals for the known type of gases at the measurement temperatures. The number of types of gases in the gaseous sample determines the least number of equations needed to find out the concentration. The coefficients of these linear combinations are the concentrations of types of gas in the gaseous sample.

With another method a gas mixture can be identified.

The method for identifying a gas mixture, comprises the steps of:

a. Heating a gaseous sample with an infrared radiator in a photoacoustic measurement setup, wherein the infrared radiator has at least two heaters, the heaters each having a broadband excitation spectrum different from that of the other heater, and wherein the intensity of the heaters are periodically modulated with a same frequency, and wherein the modulations of the heaters have a phase difference to each other, b. Detecting a measurement signal, wherein the measurement signal is negative, positive or zero depending on the phase-dependent sum of the broadband excitation spectra and an absorption line of the gaseous sample, c. Changing the phase difference between the heaters and repeating step b., wherein the change is intended to approximate the measurement signal closer to zero, d. Repeating step c. until the measurement signal becomes zero, minimal or lower than a threshold value, e. Calculating the wavelength at which the phase-dependent sum of the output spectra becomes zero, minimal or lower than a threshold value, taking as phase difference the phase difference at which the measurement signal is zero, minimal or lower than a threshold value, f. Identification of the gaseous sample by comparing the wavelength calculated in step e. with known gas spectra or reference spectra.

As the gaseous sample is subjected to the phase-shifted and non-phase-shifted light, the acoustic wave generated in the gaseous volume is dependent on the phase-dependent sum of the broadband excitation light of the at least two heaters. The magnitude of a detectable acoustic wave is dependent on the phase-dependent sum of both excitation spectra and the absorption spectrum of the gas. If the phase-dependent sum spectrum of both excitation spectra at an absorption line of the gas is positive, the signal of acoustic sensor will be positive. If the phase-dependent sum spectrum of both excitation spectra at an absorption line of the gas is negative, the signal of acoustic sensor will be negative. In case that the phase-dependent sum spectrum of both excitation spectra at an absorption line of the gas is zero, the signal of acoustic sensor will also be zero. By shifting the phase, the phase-dependent sum and hence the signal of the acoustic sensor is tuned. If the signal of the acoustic sensor becomes zero or minimal the zero-point of the phase-dependent sum of the excitation spectra coincides with an absorption line of the gas. Hence, an absorption line of the gaseous sample can be identified by calculating the zero-points of the phase-dependent sum of the excitation spectra at a given phase, where the acoustic signal is minimal. In such a way the type of gas can be identified by comparing the detected absorption line with known absorption spectra.

Alternatively to the method above, in step c., instead of the phase difference an excitation spectrum of the heaters can be changed with a change in temperature in at least one heater.

By changing the temperature of one heater, the broadband excitation light of the heater is changed, too. Hence, a phase-dependent sum of both broadband excitation spectra differs, too, if the temperature of one heater is changed. Analog to the previous method a zero-point of the phase-dependent sum can be tuned over the wavelength by amending the temperature. If the zero-point of the phase-dependent sum coincides with an absorption line of the gas, the signal of the acoustic sensor becomes zero or minimal. In case that the incremental changes cannot be made small enough a lower threshold for the signal of the acoustic sensor can be defined which is seen as zero.

BRIEF DESCRIPTION OF THE DRAWINGS

In the following the invention and a method of manufacture is described based on embodiments with reference to the figures. Same parts or parts with equivalent effect are referred to by the same reference numbers.

The figures serve solely to illustrate the invention and are therefore only schematic and not drawn to scale. Some parts may be exaggerated or distorted in the dimensions. Therefore, neither absolute nor relative dimensions can be taken from the figures. Identical or identically acting parts are provided with the same reference numerals.

FIG. 7 shows two exemplary phase-dependent sums, each a sum of two broadband excitation spectra at two different temperatures;

DETAILED DESCRIPTION

Figure 1:
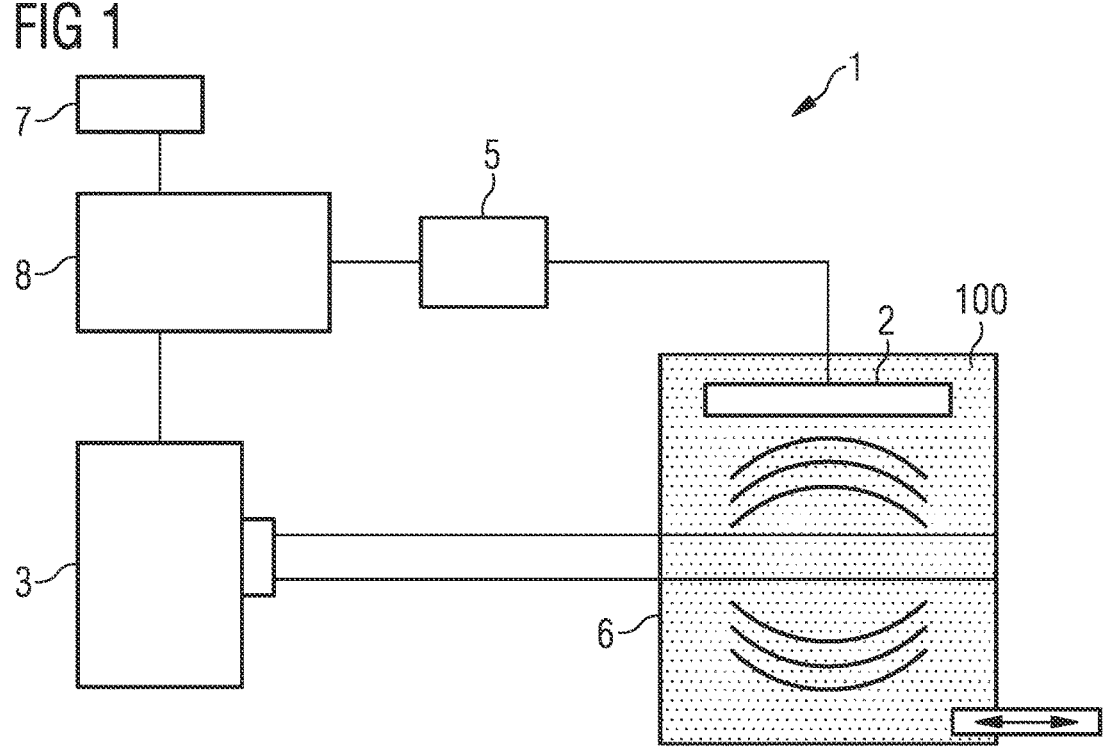
FIG. 1 shows a simplified photoacoustic measurement setup in a first embodiment.

FIG. 1 shows a schematic photoacoustic measurement setup 1 in a first embodiment. An infrared radiator 3 emits broadband light, which is periodically modulated, through a window into a photoacoustic cell 6. The infrared light heats a gas volume in the photoacoustic cell 6, which leads to an expansion of the volume. As the broadband excitation light is periodically modulated in the intensity, the periodic modulation is transferred to the volume expansion of the gas volume. Hence, an acoustic wave with the same frequency as the periodic modulation of the broadband excitation light is generated. An acoustic sensor 2, which is arranged in the photoacoustic cell 6, measures the acoustic wave as an acoustic detector signal. The acoustic sensor 2 is phase sensitive to the acoustic wave and can measure positive- and negative pressure. As the acoustic wave is enclosed in the photoacoustic cell 6, the acoustic wave does not dissipate. Therefore, the acoustic detector signal is improved compared to an embodiment without photoacoustic cell 6.

A lock-in amplifier 5 is connected in between the acoustic sensor 2 and a control and evaluation unit 8, which controls the infrared radiator 3. As the control and evaluation unit 8 supplies the lock-in amplifier 5 with a frequency and phase information of the modulation of the infrared radiator 3, the lock-in amplifier 5 can improve the signal-to-noise ratio of the setup.

Additionally, a memory 7 is connected to the control and evaluation unit 8. The memory 7 contains reference spectra of different pure gases or mixtures of gases, wherein the most straightforward spectra would be a plot of the acoustic sensor 2 signal vs. a temperature of the infrared radiator 3. The control and evaluation unit 8 uses the reference spectra to identify a gas in the photoacoustic cell 6. The control and evaluation unit 8 could contain an artificial neural network for the identification of the gases, as neural networks are convenient for pattern recognition. Reference spectra can be used to teach the neural network.

Figure 2:
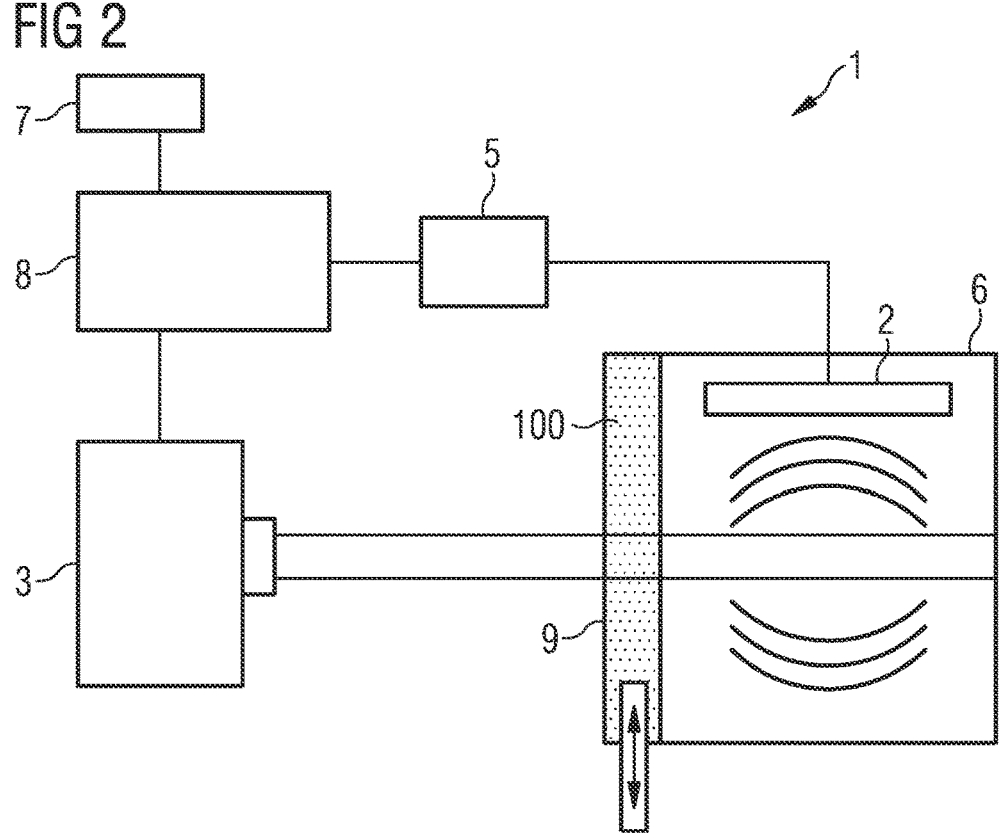
FIG. 2 shows a simplified photoacoustic measurement setup in a second embodiment.

The setup shown in FIG. 2 is similar to the setup in FIG. 1. The main differences are that the gas volume is located between the infrared radiator 3 and a photoacoustic cell 6 and that a reference gas is located in the photoacoustic cell 6. The reference gas is a known type of gas. The gas volume contains the gas which is to be examined. In particular, the setup shown in FIG. 2 allows to check if the known reference gas is present in the gas volume.

The gas volume is located in an additional chamber 9 in front of the photoacoustic cell, but the gas volume could also be in free space in the beam of the infrared radiator 3. The photoacoustic cell 6 is sealed gas-tight against the additional chamber 9 and the additional chamber 9 has windows which allow the infrared light to enter and pass to the acoustic cell 6. The setup verifies whether the type of gas, the reference gas is, is contained in the measured gas volume.

The infrared light passes the gas volume on the way to the photoacoustic cell 6. If the type of gas, the reference gas is, is contained in the gas volume, certain wavelength of the infrared light, which are characteristic for this type of gas, are absorbed. Depending on the concentration in the gas volume and the length of the light path in the absorbing gas volume, according to Beer-Lambert law, more or less light of the certain wavelengths is absorbed. The reference gas in the photoacoustic chamber 6, on the other side, is heated by exactly the same wavelengths which were absorbed in the gas volume. Hence, if there is the type of gas, the reference gas is, in the gas volume, less light reaches the reference gas in the photoacoustic cell 6, the reference gas is heated less and the acoustic sensor 2 signal drops significantly. The amount of signal decrease is determined by the concentration of the gas. In the case, that no type of gas, the reference gas is, is present in the gas volume, no characteristic wavelengths are absorbed in the gas volume and the acoustic sensor 2 signal is not attenuated by the gas volume.

Figure 3:
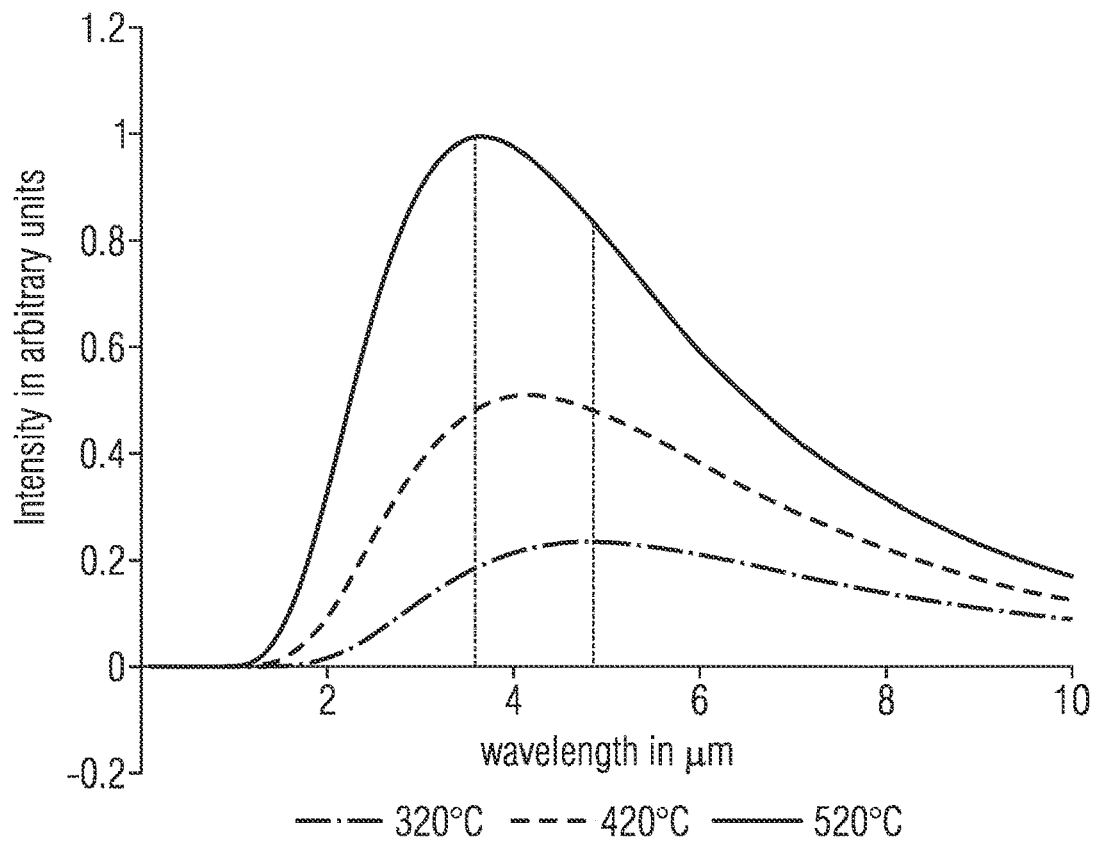
FIG. 3 shows exemplary broadband excitation spectra at different temperatures.

In FIG. 3 three broadband excitation spectra of a thermal infrared radiator 3 at 320° C., 420° C. and 520° C. are shown. The graphs are normalized to the peak of the spectra at 520° C. With increasing temperature the height of the peak increases. Since the graphs are normalized to the peak value of 520° C., the peak value for 520° C. is 1. The peak value of the graph for 320° C., on the other side, is just ~0.2. Moreover, the peak value is shifted towards lower wavelengths with increasing temperature. Also the slope of the graphs from the peak value towards higher wavelength is steeper for higher temperatures. Overall, the broadband excitation spectra can be considerably modified by changing the temperature.

Moreover, two idealized vertical absorption lines, corresponding to two different gases, are drawn in the graph in FIG. 3 at ~3.8 μm and ~5 μm. Comparing the intersection of the absorption lines with the broadband excitation spectra at 320° C. and 520° C., it is to be noticed that the gas with the absorption line at 5 μm absorbs more energy than the gas with the absorption line at 3.8 μm at 320° C., whereby the gas with the absorption line at 5 μm absorbs less energy than the gas with the absorption line at 3.8 μm at 520° C. As the absorbed energy is linear dependent to acoustic sensor 2 signal, this difference would be detectable in the acoustic sensor 2 signal, too.

Figure 4:
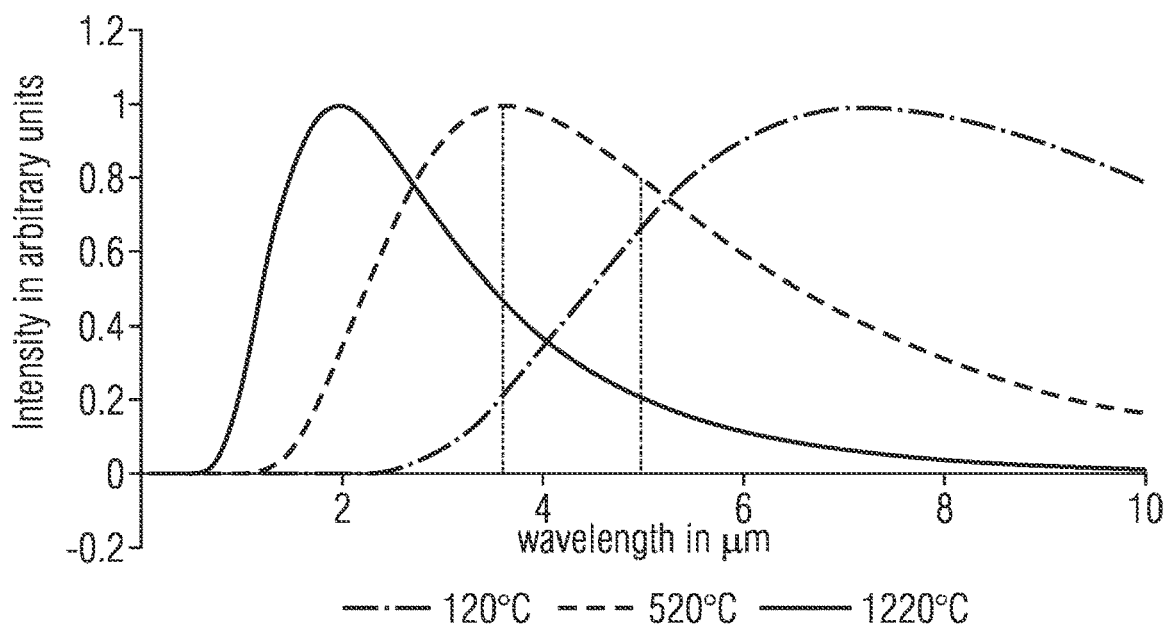
FIG. 4 shows normalized broadband excitation spectra at different temperatures.

FIG. 4 also shows three broadband excitation spectra of an infrared radiator 3, but in this figure each spectrum is normalized and the temperatures of the infrared radiator 3 are 120° C., 520° C. and 1220° C. The same idealized vertical absorption lines, as in FIG. 3, corresponding to two different gases, are drawn in the graph at ~3.8 μm and ~5 μm. As the temperatures of the drawn spectra have a higher difference and are normalized, the shifting of the peak and the differences in the slopes are even more obvious.

The differences in absorption of two gases at different temperatures already can be exploited, if it is to be ensured that a known pure gas is in the gas volume. First the gas volume is measured at a first temperature and then at a second temperature. On the basis of the first measurement signal an expected second measurement signal, depending on the broadband excitation spectrum at the second temperature, can be calculated under the assumption that just the pure gas is in the gas volume. If the expected signal matches the measured signal just the pure gas is in the gas volume. Else at least one other component is present in the gas volume.

In the case that it is known that the gaseous sample contains two known types of gases, the method is also suitable to determine the concentration of both gases in the gaseous sample. For this a system of two equation, each a linear combination of the known acoustic sensor 2 signals for the first and second type of gas at the first and second measurement temperature has to be solved. The coefficients of this linear combinations are the concentrations of two types of gas in the gaseous sample. The proposed method can be extended to a third or n-th gas with a third or n-th measurement point corresponding to another temperature.

Emitting the same energy at different temperatures, corresponding to the normalization in FIG. 4, is a challenging task for a thermal infrared radiator 3. The infrared radiator 3 can be seen as a black body, which obeys the Stefan-Boltzmann law. As the emitted power has a dependency on the 4th power of the temperature, the emitted power has to be adjusted for different temperatures. This can be done by adapting the emitting surface, which is linear to the emitted power.

Figure 5:
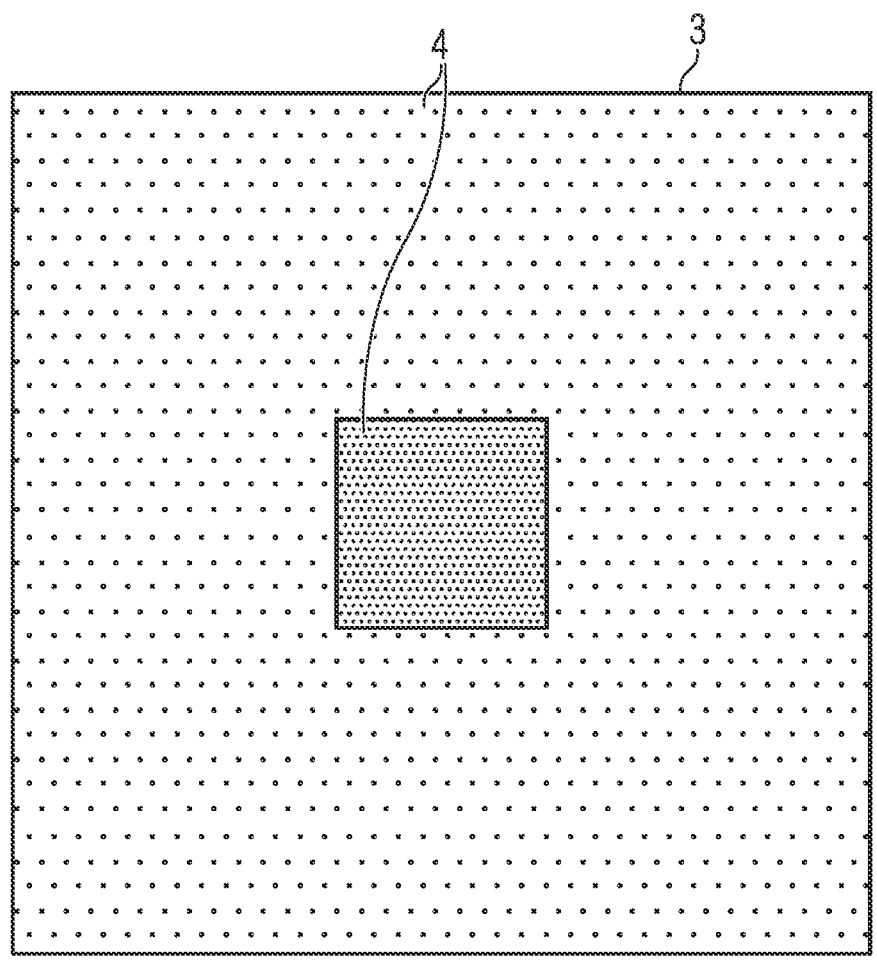
FIG. 5 shows a simplified infrared radiator comprising two heaters.

FIG. 5 shows an infrared radiator 3 comprising two heaters 4, which emit broadband excitation spectra in the infrared and emit spectra similar to a black body dependent on the temperature. The larger heater 4 is configured to have 16 times the emitting surface compared the smaller heater 4 in the centre. As the heaters 4 obey the Stefan-Boltzmann law, both heaters 4 emit the same power if the temperature of the smaller heater 4 is twice the temperature of the larger heater 4, whereby the temperature is given in Kelvin.

Figure 6:
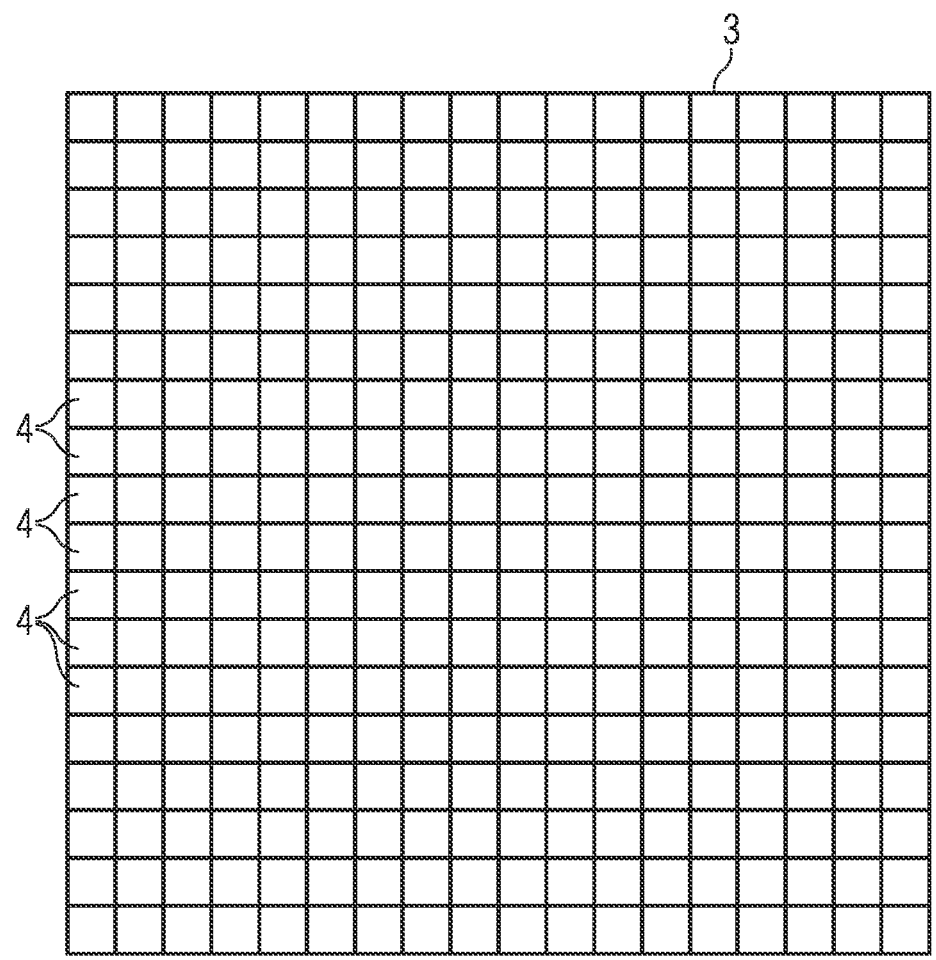
FIG. 6 shows a simplified infrared radiator comprising 324 heaters.

A more flexible embodiment of the infrared radiator 3 is composed of 324 heaters 4 in an 18*18 array is shown in FIG. 6. Such an infrared radiator 3 can adapt the emitting surface to different temperatures and hence different broadband excitation spectra to a higher degree of freedom compared to the embodiment in FIG. 5.

To keep the infrared radiator 3 relatively small, the heaters 4 can be silicon-based to make use of MEMS technology and processes. The Silicon-based microheaters have an edge length of less than 500 μm. The heaters 4 in a heater array should each be individually controllable, to ensure that the broadband excitation spectrum, the emitted power and also the temporal modulation can be adjusted at will.

FIG. 7 shows two exemplary phase-dependent sums, each a sum of two broadband excitation spectra at two different temperatures. In both sums the phase difference is 180°, such that one spectra just has to be deducted by the other spectrum. The temperatures of the heaters 4 are 620° C. and 220° C. for the dark line and 420° C. and 220° C. for the brighter line. At ~5 μm is a vertical idealized absorption line of a gas.

A gas volume interacts with both, the phase-shifted and non-phase-shifted light. Hence, the acoustic wave generated is dependent on the phase-dependent sum of the broadband excitation light. The acoustic detector signal sign is dependent on whether the phase-dependent is positive or negative at the wavelength of the absorption line of the gas. If the phase-dependent sum is zero at the wavelength of the absorption line, the signal of the acoustic detector also becomes zero, as the phase-shifted and non-phase-shifted acoustic wave annihilate each other.

By shifting the phase or changing the excitation spectra by changing the temperature, the phase-dependent sum is tuned. In FIG. 7, for example, the temperature of one of the heaters 4 has been decreased from 620° C. to 420° C., while maintaining the same phase difference. As a consequence, the zero-point or equilibrium point of the phase-dependent sum, has been shifted from ~4.2 μm to ~5 μm. As the absorption line of the measured gas is at 5 μm, the acoustic sensor 2 would have a positive signal in the case of the dark line. The signal would become zero in the second case, where the second heater 4 has a temperature of 420° C.

Therefore, a gas can be identified by tuning the phase-dependent sum, whether by temperature, phase or intensity, in order to find a detector signal, which is zero or nearly zero. The zero-point of the found phase-dependent sum corresponds to an absorption line of the gas, which is thereby identified.

The invention claimed is:
1. A photoacoustic measurement setup, comprising,
an infrared radiator, the infrared radiator being suitable for radiating broadband light with periodically modulated intensity, the infrared radiator including at least two individually controllable heaters,
wherein the infrared radiator is configured to change an excitation spectra of the radiated broadband light, wherein the infrared radiator is suitable to heat a gas volume with the broadband light and to generate an acoustic wave within the gas volume, and
an acoustic sensor, the acoustic sensor being suitable for measuring the acoustic wave generated, wherein the excitation spectra emitted by the infrared radiator is changed by changing a temperature of the infrared radiator.

2. The photoacoustic measurement setup according to claim 1, wherein the excitation spectra emitted by the infrared radiator is changed by a periodic intensity modulation of at least one heater being phase-shifted with respect to the periodic intensity modulation of at least one other heater.

3. The photoacoustic setup according to claim 1, wherein the heaters are silicon-based.

4. The photoacoustic measurement setup according to claim 1, wherein the infrared radiator is suitable to emit the same light intensity for different broadband excitation spectra by adjusting a surface from which heat is emitted.

5. The photoacoustic measurement setup according to claim 1, further comprising a lock-in amplifier to amplify a measurement signal provided by the acoustic sensor.

6. The photoacoustic measurement setup according to claim 1, wherein a wave guide is configured to guide the light from the infrared radiator to the gas volume.

7. The photoacoustic measurement setup according to claim 1, wherein the gas volume and the acoustic sensor are arranged in a photoacoustic cell.

8. The photoacoustic measurement setup according to claim 1,
wherein the gas volume is located between the infrared radiator and a photoacoustic cell, and
wherein a reference gas and the acoustic sensor are arranged in the photoacoustic cell.

9. The photoacoustic measurement setup according to claim 1, further comprising,
a memory, at least one reference spectrum being stored therein,
a control and evaluation unit which is designed to compare the reference spectrum with the measured values and to assign a content of the gas volume to a gas or a gas mixture and/or to determine a concentration of a gas mixture and
to control the infrared radiator.

10. The photoacoustic measurement setup according to claim 9,
wherein the control and evaluation unit has a neural network.

11. The photoacoustic measurement setup according to claim 1,
wherein the infrared radiator comprises at least two heaters,
wherein the excitation spectra emitted by the infrared radiator is changed by a periodic intensity modulation of at least one heater being phase-shifted with respect to the periodic intensity modulation of at least one other heater,
wherein the gas volume and the acoustic sensor are arranged in a photoacoustic cell, and
wherein the heaters are arranged outside the photoacoustic cell.

12. A method for detecting a gas mixture, comprising the steps of:
a. Detecting a first measurement signal of a composite gaseous sample, wherein the gaseous sample contains a first type of gas, that is known, and at least one further type of gas, with the photoacoustic measurement setup according to claim 1, wherein the infrared radiator emits light with a first broadband excitation spectrum at a first temperature,
b. Detecting a second measurement signal of the composite gaseous sample with the photoacoustic measurement setup, wherein the infrared radiator emits light with a second broadband excitation spectrum at a second temperature,
c. Calculating an expected second measurement signal from the first measurement signal and the reference spectrum assuming that the gaseous sample is exclusively the first type of gas,
d. Compare the expected second measurement signal with the measured second measurement signal,
e. Determining if a further type of gas is in the gaseous sample.

13. The method for detecting a gas mixture according to the claim 12,
wherein in step b. a third measurement signal of the composite gaseous sample is detected with the photoacoustic measurement setup, wherein the infrared radiator emits light with a third excitation spectrum at a third temperature, and
wherein in step c. a third expected measurement signal is calculated from the first and second measurement signal and the reference spectrum assuming that the gaseous sample is exclusively the first and second type of gas, and
wherein in step d. the third expected measurement signal is compared with the measured third measurement signal, and
wherein in step e. it is determined if at least one further type of gas is included in the gaseous sample.

14. The method for identifying a gas, comprising the steps of:
a. Heating a gaseous sample with an infrared radiator in the photoacoustic measurement setup according to claim 1,
wherein the infrared radiator has at least two heaters, the heaters each having a broadband excitation spectrum different from that of the other heater, and
wherein the intensity of the heaters are periodically modulated with the same frequency, and
wherein the modulations of the heaters have a phase difference to each other,
b. Detecting a measurement signal, wherein the measurement signal is negative, positive or zero depending on the phase-dependent sum of the broadband excitation spectra and an absorption line of the gaseous sample,
c. Changing the phase difference between the heaters and repeating step b., wherein the change is intended to approximate the measurement signal closer to zero,
d. Repeating step c. until the measurement signal becomes zero, minimal or lower than a threshold value,
e. Calculating the wavelength at which the phase-dependent sum of the output spectra becomes zero, minimal or lower than a threshold value, taking as phase difference the phase difference at which the measurement signal is zero, minimal or lower than a threshold value,
f. Identification of the gaseous sample by comparing the wavelength calculated in step e. with known gas spectra or reference spectra.

15. The method for identifying a gas according to claim 14, wherein in step c. instead of the phase difference an excitation spectrum of the heater is changed with a change in temperature in at least one heater.

16. A photoacoustic measurement setup, comprising:
an infrared radiator, the infrared radiator being suitable for radiating broadband light with periodically modulated intensity, the infrared radiator including at least two heaters, wherein the infrared radiator is configured to change an excitation spectra of the radiated broadband light, wherein the infrared radiator is suitable to heat a gas volume with the broadband light and to generate an acoustic wave within the gas volume, and
an acoustic sensor, the acoustic sensor being suitable for measuring the acoustic wave generated, wherein the excitation spectra emitted by the infrared radiator is changed by changing a temperature of the infrared radiator, and
wherein the excitation spectra emitted by the infrared radiator is changed by a periodic intensity modulation of at least one heater being phase-shifted with respect to the periodic intensity modulation of at least one other heater.

17. A photoacoustic measurement setup, comprising:
an infrared radiator, the infrared radiator being suitable for radiating broadband light with periodically modulated intensity,
wherein the infrared radiator is configured to change an excitation spectra of the radiated broadband light, wherein the infrared radiator is suitable to heat a gas volume with the broadband light and to generate an acoustic wave within the gas volume, and
an acoustic sensor, the acoustic sensor being suitable for measuring the acoustic wave generated,
wherein the gas volume is located between the infrared radiator and a photoacoustic cell, and
wherein a reference gas and the acoustic sensor are arranged in the photoacoustic cell.

18. A photoacoustic measurement setup, comprising:
an infrared radiator, the infrared radiator being suitable for radiating broadband light with periodically modulated intensity, the infrared radiator including at least two individually controllable heaters,
wherein the infrared radiator is configured to change an excitation spectra of the radiated broadband light, wherein the infrared radiator is suitable to heat a gas volume with the broadband light and to generate an acoustic wave within the gas volume,
an acoustic sensor, the acoustic sensor being suitable for measuring the acoustic wave generated,
a memory, at least one reference spectrum being stored therein, and
a control and evaluation unit which is designed to compare the reference spectrum with the measured values and to assign a content of the gas volume to a gas or a gas mixture and/or to determine a concentration of a gas mixture and to control the infrared radiator.

19. A photoacoustic measurement setup, comprising:
an infrared radiator, the infrared radiator being suitable for radiating broadband light with periodically modulated intensity,
wherein the infrared radiator is configured to change an excitation spectra of the radiated broadband light, wherein the infrared radiator is suitable to heat a gas volume with the broadband light and to generate an acoustic wave within the gas volume, and
an acoustic sensor, the acoustic sensor being suitable for measuring the acoustic wave generated,
wherein the infrared radiator comprises at least two heaters,
wherein the excitation spectra emitted by the infrared radiator is changed by a periodic intensity modulation of at least one heater being phase-shifted with respect to the periodic intensity modulation of at least one other heater,
wherein the gas volume and the acoustic sensor are arranged in a photoacoustic cell, and
wherein the heaters are arranged outside the photoacoustic cell.

* * * * *